United States Patent [19]

Sampei et al.

[11] Patent Number: 5,020,151
[45] Date of Patent: May 28, 1991

[54] RELEASABLE MOUNTING FOR AN AUDIO DEVICE

[75] Inventors: Kazue Sampei; Takashi Suzuki; Futoshi Ujiie, all of Iwaki, Japan

[73] Assignee: Alpine Electronics Inc., Tokyo, Japan

[21] Appl. No.: 88,697

[22] Filed: Aug. 21, 1987

[30] Foreign Application Priority Data

Nov. 11, 1986 [JP] Japan .......................... 61-173232[U]
Nov. 11, 1986 [JP] Japan .......................... 61-173233[U]
Mar. 20, 1987 [JP] Japan .......................... 62-41691[U]

[51] Int. Cl.$^5$ .............................................. H04B 1/06
[52] U.S. Cl. .................................. 455/345; 455/348; 312/71; 361/391
[58] Field of Search ............... 455/345, 346, 347, 348, 455/349; 312/7.1, 7.2, 242, 246, 320; 307/10 AT; 361/340, 342, 391, 422

[56] References Cited

U.S. PATENT DOCUMENTS

| | | | |
|---|---|---|---|
| 4,061,971 | 12/1977 | Barrons | 455/346 |
| 4,211,995 | 7/1980 | Smith | 455/348 |
| 4,623,110 | 11/1986 | Kanari | 248/27.1 |
| 4,679,026 | 7/1987 | Knakowski et al. | 455/346 |
| 4,829,595 | 5/1989 | Kobayashi et al. | 455/348 |

FOREIGN PATENT DOCUMENTS 1209317 5/1960 France .......................... 455/346

*Primary Examiner*—Curtis A. Kuntz
*Attorney, Agent, or Firm*—Guy W. Shoup; Paul J. Winters

[57] ABSTRACT

An automotive audio device includes a handle provided at a front operation board of the audio device so that the audio device is readily removed or mounted with respect to an inner case fixed to a dashboard of a car by merely moving the handle vertically. With this arrangement, a user never feel it troublesome to remove the audio device from the dashboard and bring it with him for the antitheft purpose when he leaves the car.

8 Claims, 4 Drawing Sheets

Fig. 1
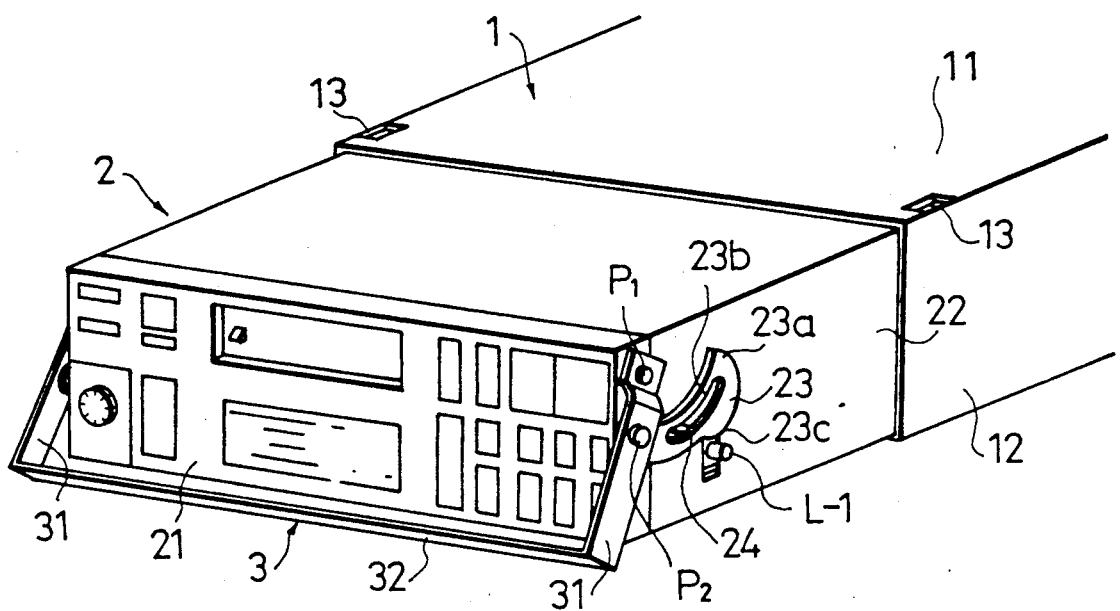
Fig. 3
Fig. 2
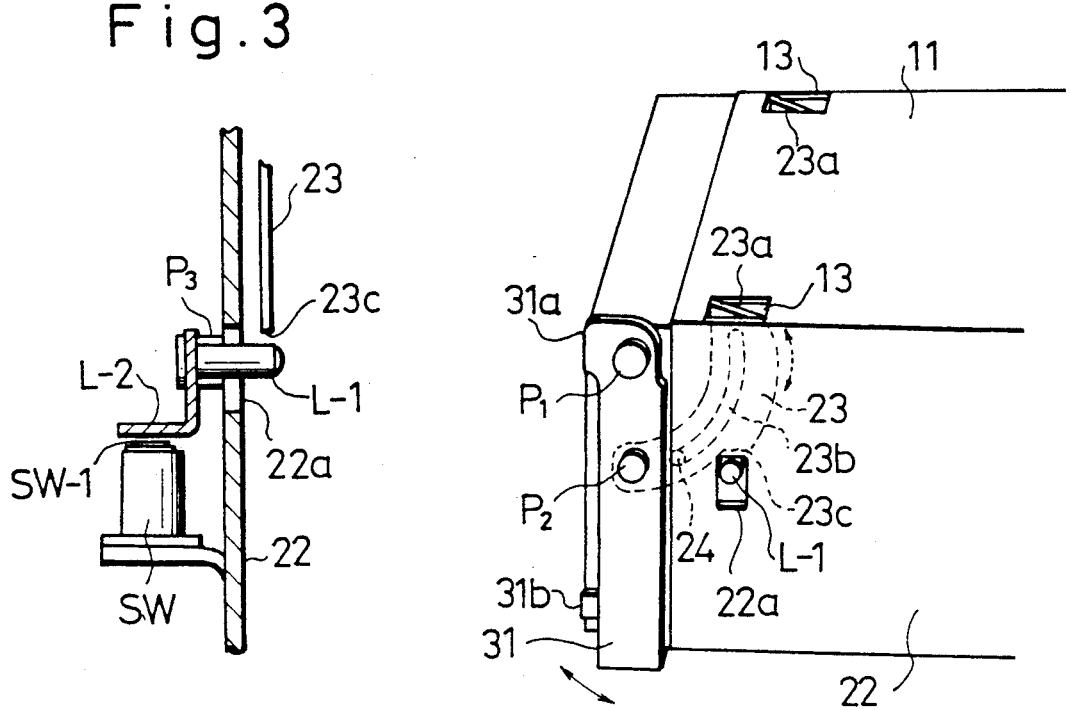

5,020,151

RELEASABLE MOUNTING FOR AN AUDIO DEVICE

FIELD OF THE INVENTION

This invention relates to a releasable mounting for an automotive audio device, and more particularly to a releasable mounting structure with respect to a dashboard of a car which facilitates removal of the automotive device for the antitheft purpose, and never invites any damage of interior mechanisms of the device due to frequent removal of the device.

BACKGROUND OF THE INVENTION

Recently, car stereos, CD players and other car audio devices are often stolen as much as their quality and grade have been elevated. In order to protect an audio device against pilferage, it is desired to provide a mechanism which releasably mount the audio device in an inner case fixed to a dashboard of a car to facilitate a user to readily remove the audio device from the inner case and bring it with him when he leaves the car. However, a significant strength of the dashboard itself is required against frequent removal of the audio device to protect inner mechanisms of the audio device.

OBJECT OF THE INVENTION

It is therefore an object of the invention to provide a releasable mounting for an automotive audio device to enable audio device to be readily mounted and removed with respect to an inner case fixed to a dashboard of a car, not causing any damage of inner mechanisms of the device but directly, effectively protecting the device against pilferage.

A further object of the invention is to provide a releasable mounting for an automotive audio device to enable the audio device to be reliably locked to the inner case.

A still further object of the invention is to hold inner mechanisms of the audio device in a pause mode upon removal of the audio device from the inner case in order to prevent any damage to the device.

A yet further object of the invention is to provide a releasable mounting for an automotive audio device to enable the audio device to have a handle which is readily operated by a user.

A yet further object of the invention is to provide a unique handle-fixing arrangement to facilitate a user to readily remove the handle assembly.

A yet further object of the invention is to prevent loose engagement of the handle.

SUMMARY OF THE INVENTION

To attain the aforegoing objects of the invention, there is provided a releasable mounting for an automotive audio device including a handle affixed to a front operation panel thereof, which handle is operated up and down so that an end of a handle support plate connected thereto releasably engages an engage hole of an inner case. The handle support plate has a cam edge which actuates a pause switch.

BRIEF DESCRIPTION OF THE DRAWINGS

FIG. 1 is a schematic perspective view which shows how a device is mounted in an inner case;

FIG. 2 is a schematic side elevation for explanation of lock device;

FIG. 3 is a schematic cross-sectional view for explanation of the pause switch activated by the handle support plate;

DETAILED DESCRIPTION

Figure 4:
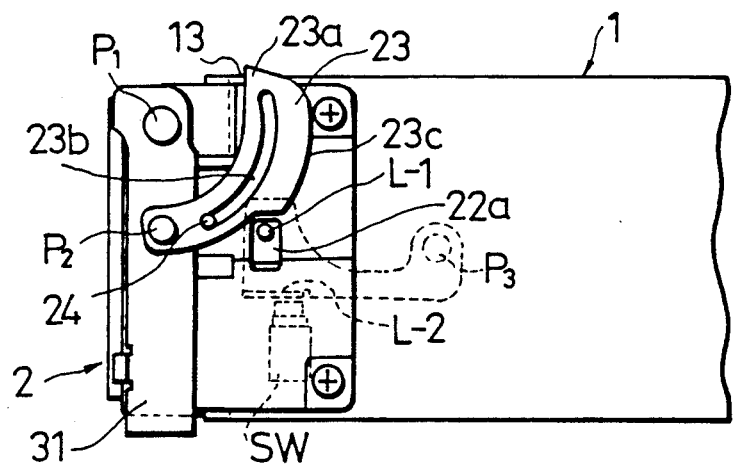
FIG. 4 is a schematic side elevation showing the device mounted in the inner case.

The invention is described below in detail, referring to a preferred embodiment illustrated in the drawings.

FIG. 1 is a schematic perspective view of a device housing 2 and an inner case 1 partly accepting the device 2 therein.

The inner case 1 is a box-shaped member made from a thin steel sheet or similar material and having a front aperture. At edges defined by an upper plate 11 and side walls 12 of the inner case 1 are provided a pair of engage holes 13—13.

The device housing 2 contains therein a cassette tape player, CD player or other audio device. The device housing 2 has a nose, i.e. operation board, which defines the front face thereof. The operation board 21 has an insertion aperture through which a cassette tape or a compact disc is inserted. One of side walls 22 of the device 2 is provided with a hole 22a through which a switching lever L-1 protrudes to receive external force to operate a pause switch SW.

The operation board 21 supports a channel-shaped handle 3 including a pair of arms 31—31 and a grip 32. Each arm 31 has one end pivotably supported by a pivot P1 as shown in FIG. 2 to allow vertical movement of the grip 32 about the pivot P1. Each arm 31 pivotably supports an engage plate 23 via a pivot P2 at a position nearer to the grip 32 than the pivot P1. Each engage plate 23 includes a tapered distal end 23a and an arcuate slide groove 23b slidably engaging a guide pin 24 upstanding from each side wall 22 of the device housing 2.

One of the engage plates 23 (associated with the switching lever L-1) is provided with a cam edge 23c bulging out from the bottom edge of the engage plate 23 to engage the switching lever L-1 projecting through the hole 22a of the side wall 22.

The switching lever L-1 extending through the hole 22a of the side wall 22 as shown in a schematic cross-sectional view of FIG. 3 to move a movable piece L-2 about a shaft P3. More specifically, when the movably piece L-2 depresses a contact portion SW-1 of the pause switch SW, the switch is turned on. When the depression is cancelled, the switch is automatically turned off.

With the above-described locking arrangement, the audio device is mounted or removed as explained below, referring to FIGS. 4 through 6.

Although the following explanation refers to members at one side of the device where the pause switch switching lever L-1 exists, the same engagements and disengagements are also effected at the other side of the audio device.

First, the device housing 2 is removed from the inner case 1 in the following fashion.

As shown in FIG. 4, the device housing 2 is heretofore held at a predetermined position in the inner case 1. In this configuration, the end 23a of the engage plate 23 engages the engage hole 13 to establish a locked condition. The cam edge 23c of the engage plate 23 is apart from the switching lever L-1, and the pause switch SW is held in its off-condition.

Figure 5:
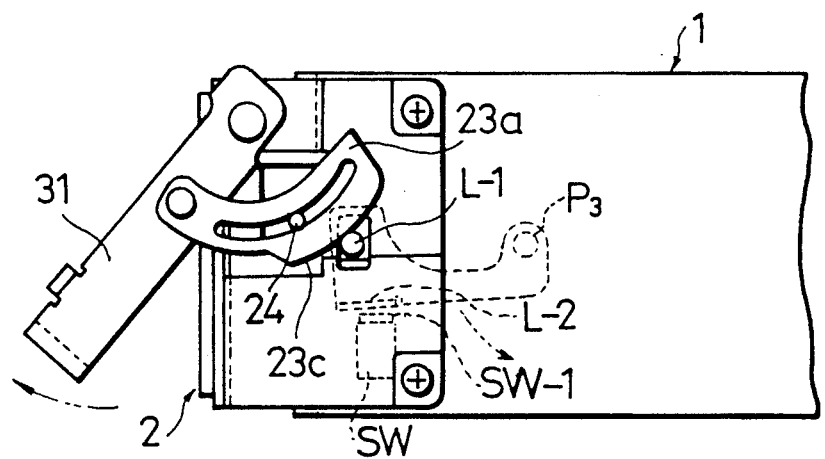
FIG. 5 is a schematic side elevation showing the pause switch changed to its on-position by upward rotation of a handle.

When the handle 3 is subsequently rotated upwardly about the pivot P1 as shown in FIG. 5, pulling together the engage plate 23, the end 23a of the engage plate 23 drops from the engage hole 13. At the same time, the cam edge 23c of the engage plate 23 depresses the switching lever L-1 downwardly so that the movable piece L-2 is moved down accordingly via the shaft P3 to urge the contact portion SW-1 of the pause switch SW. Due to this, the pause switch SW is turned on to establish a temporary dormant mode of the device, such as disengagement between a capstan shaft and a pinch roller to interrupt tape transport.

Figure 6:
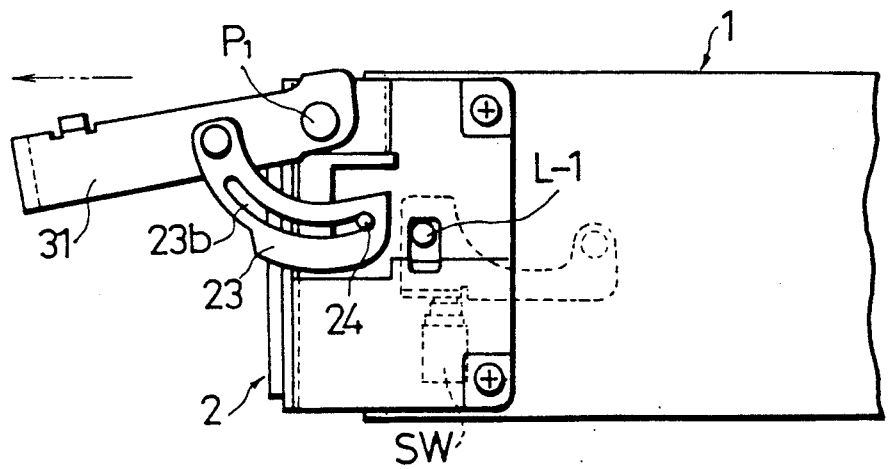
FIG. 6 is a schematic side elevation showing the handle rotated to a fully elevated position for removal of the device.

When the handle 3 is fully elevated and pulled out as shown in FIG. 6, a power source connector (not shown) is detached, and the device housing 2 may be fully pulled out from the inner case 1.

To mount the device housing 2 in the inner case 1, a user may follow the opposite course (from the configuration of FIG. 6 through the configuration of FIG. 5 to the configuration of FIG. 4), so that the engage plate 23 is moved upward along the guide pin 24a until the end 23a engages the engage hole 13 of the inner case 1. At the same time, the power source connector is connected to supply the device 2 with a driving power.

The handle 3 is held at the lowest position to take a parallel relationship with the front face of the device 2 when the device 2 is held in position in the inner case 1. In order to facilitate a user to initially rotate the handle 3 to a position where he can clasp the grip 32, a projection 31a may be provided on the arm 31 so that compression against the projection 31a causes pivotal movement of the arm 31 about the pivot P1 to bring the grip 32 forward. Alternatively, a projection 31b may be formed on the arm 31 so that a user may pick and pull it to expose the grip 32.

A further embodiment of the invention is describe below, referring to the drawings.

Figure 7:
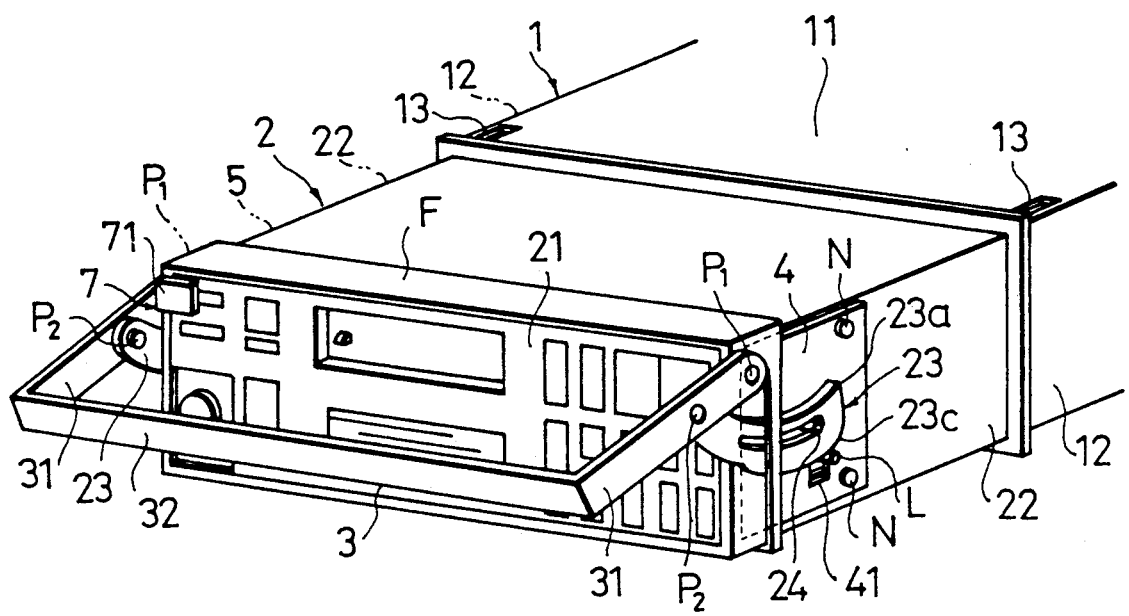
FIG. 7 is a schematic perspective view of the device partly accepted by the inner case.
Figure 8:
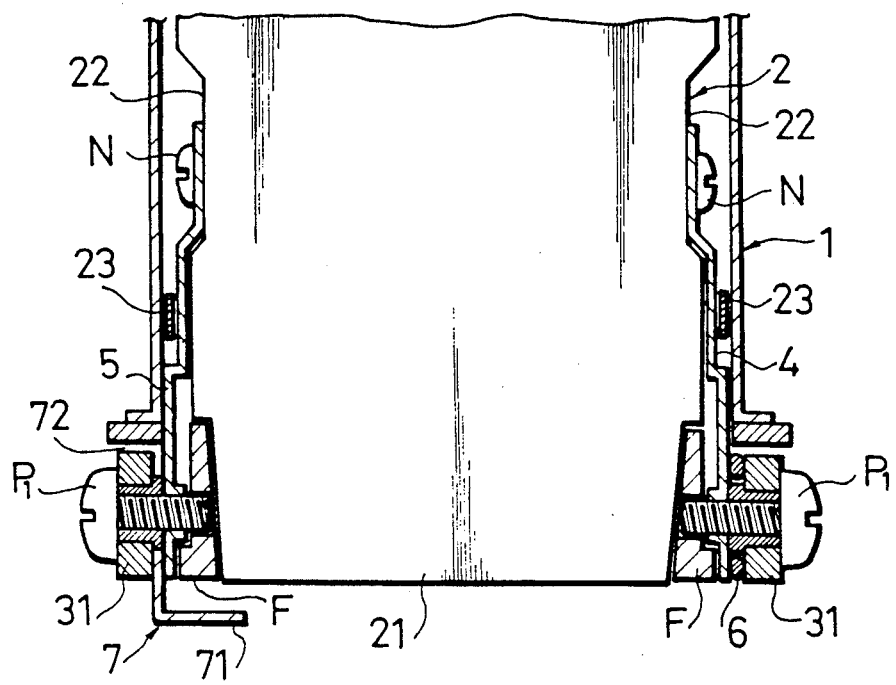
FIG. 8 is a schematic horizontal cross-sectional view of the device which is held in position in the inner case.

FIG. 7 is a schematic perspective view of an audio device housing 2 partly accepted in an inner case 1. FIG. 8 is a schematic horizontal cross-sectional view of the device fully inserted in the inner case 1.

The inner case 1 is a box-shaped member made from a thin steel sheet or similar material and having a front aperture. At edges defined by an upper plate 11 and side walls 12—12 of the inner case 1 are provided a pair of engage holes 13—13.

The device housing 2 includes a cassette tape player, CD player or other audio device. The device housing 2 has a nose, i.e. operation board 21 which defines the front face thereof. The operation board 21 has an insertion aperture through which a cassette tape or a compact disc is inserted.

The operation board 21 is encircled by a face plate F and supports a channel-shaped handle 3 consisting of a pair of arms 31—31 and a grip 32. Each arm 31 has one end pivotably connected to a handle support plate 4 (or 5) by a pivot P1 to allow vertical movement of the grip 32 about the pivot P1. Each handle support plate 4 (or 5) is fixed to each side wall 22 of the device housing 2 by bolts N-N. The face plate F is also fixed to the handle support plates 4 and 5.

As shown in FIG. 8, between one of the handle support plates, e.g. the right-hand handle support plate 4 and the arm 31 is interposed in a compressed fashion a ring-shaped resilient member 6 encircling the pivot P1. The resilient member 6 is made from neoprene rubber or similar member having large resiliency and hard-wearing properties. The resilient member 6, when compressed, produces an adequate friction between the handle support plate 4 and the arm 31 so that the handle 3 once brought to a desired angular position never drops therefrom with its own weight.

Between the other handle support plate 5 and the arm 31 is provided a handle lifting lever 7 pivotably coaxially mounted with the pivot P1 but maintaining a close contact configuration to prevent any looseness. The handle lifting lever 7 is a plate member consisting of a center portion and two end portions upstanding from the opposite ends of the center portion in the opposite directions. When one end portion 71 of the handle lifting lever 7 exposed through the operation board 21 is depressed, the other end portion 72 located inside elevates the arm 31 of the handle 3 which is heretofore held in a position to form a unitary configuration with the face plate F. Due to this, the grip 32 is brought to a position in front of the operation board 21 to an amount to enable a user to clasp the grip 32.

Each arm 31 pivotably supports an engage plate 23 via a pivot P2 at a position nearer to the grip 32 than the pivot P1. Each engage plate 23 includes a tapered distal end 23a and an arcuate slide groove 23b which slidably engages a guide pin 24 upstanding from each handle support plate 4 (or 5).

One of the handle support plates, e.g. the right-hand handle support plate 4 has a hole 41 through which a switching lever L projects externally so that external force against the switching lever L changes the configuration of a pause switch (FIG. 3) provided in the interior of the device housing 2. Namely, the switching lever L is moved up and down by a cam edge 23c along the bottom margin of the engage plate 23 to turn on or off the pause switch.

As will be understood from the aforegoing description, the handle 3, engage plates 23—23, and handle support plates 4-5 form a unitary configuration together with the face plate F, and the unitary body is removably fixed to the device housing 2 by the bolts N-N applied on the handle support plates 4-5.

With the above-described locking arrangement, the device housing 2 is mounted and removed with respect to the inner case 1 in the following fashion.

Although the following explanation refers to members at one side of the device where the pause switch changing lever L exists, the same engagements and disengagements are also effected at the other side of the audio device.

First, removal of the device housing 2 from the inner case 1 as explained.

Figure 9:
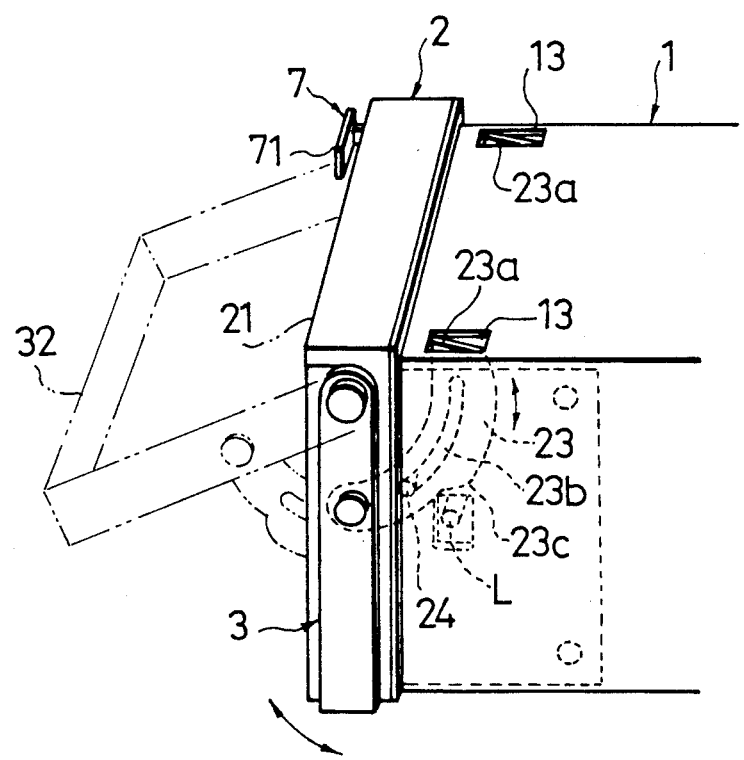
FIG. 9 is a schematic perspective view of the device which is held in position in the inner case.

As shown in the schematic perspective view of FIG. 9, the device housing 2 is heretofore held at a predetermined position in the inner case 1. In this configuration, the end 23a of the engage plate 23 engages the engage hole 13 to establish a locked condition. The cam edge 23c of the engage plate 23 is apart from the switching lever L, and the pause switch is held in its off-condition in which the audio device 2 can be driven whenever desired.

When the depression portion 71 of the handle lifting lever 7 is depressed, the handle 3 is brought to a position in front of the operation board 21. Concurrently, the guide groove 23b moves along the guide pin 24, and the end 23a of the engage plate 23 disengages from the engage hole 13. With this movement, the cam edge 23c depresses the switching lever L downwardly, and the pause switch is turned on to establish a temporary dormant mode of the audio device, such as disengagement between a capstan shaft and a pinch roller to interrupt tape transport.

When the handle 3 is fully elevated and pulled out as shown in FIG. 7, a power source connector (not shown) is detached, and the device housing 2 may be fully pulled out from the inner case 1.

To mount the device housing 2 in the inner case 1, a user may follow the opposite course of the aforegoing operations so that the engage plate 23 is lifted up along the guide pin 24 until the end 23a engages the engage hole 13 of the inner case 1. At the same time, the power source connector is connected to supply the device 2 with a driving power.

As described above, since the locking arrangement configured to not only establish engagement or disengagement of the device housing but also operate the pause switch in response to a motion of the handle, a user, by merely pulling the handle, can temporarily stop the driving mechanism in the device housing and can readily remove the device housing from the inner case. Also in mounting the device housing in the inner case, the user can readily put the interior driving mechanism in a standby configuration by merely inserting the device housing into the inner case. Therefore, the user will never feel it troublesome to remove the audio device from the dashboard and bring it with him for the antitheft purpose when he leaves the car, and frequent removal of the device never causes any damage of the interior mechanisms of the device.

Further, the use of the resilient members encircling the pivotal axes of the handle makes it possible to hold the handle at any vertical position, never dropping it with its own weight. The resilient member also eliminates undesired looseness of the handle.

What is claimed is:

1. Releasable mounting for an automotive audio device comprising: a handle consisting of a pair of arms and a grip and provided at a front operation board of the audio device, said arms being pivotally supported on side walls of the audio device; and engage plates each pivotally supported on each said arm and having one end engaging or disengaging with respect to each engage hole of an inner case when said engage plates are moved by vertical movement of said handle.

2. The releasable mounting of claim 1 wherein each of said engage plates is provided with a slide groove which slidably engages a guide pin upstanding from each side wall of the audio device.

3. The releasable mounting of claim 1 wherein each of said engage plates includes a cam edge which operates a level of a pause switch, said pause switch, upon being activated, temporarily disabling a driving mechanism in said audio device.

4. The releasable mounting of claim 1 further comprising a handle lifting lever configured to bring said grip of the handle forward.

5. Releasable mounting for an automotive audio device comprising: a handle consisting of a pair of arms and a grip and provided at a front operation board of the audio device; handle support plates attached to side walls of the audio device and pivotally supporting said arms via pivots respectively; engage plates each pivotally supported on each said arm and having one end for engagement and disengagement with respect to each engage hole of an inner case in response to vertical movement of said handle; and resilient members each provided in a compressed fashion between said handle support plate and said arm around said pivot.

6. The releasable mounting of claim 5 wherein each of said engage plates includes a cam edge which operates a lever of a pause switch, said pause switch, upon being activated, temporarily disabling a driving mechanism in said audio device.

7. The releasable mounting of claim 5 further comprising a handle lifting lever configured to bring said grip of the handle forward.

8. The releasable mounting of claim 5 wherein said handle support plates are removably affixed to said audio device.

* * * * *